(12) United States Patent
Irisawa

(10) Patent No.: US 7,358,518 B2
(45) Date of Patent: Apr. 15, 2008

(54) RADIATION IMAGE DETECTOR AND RADIATION IMAGE DETECTING SYSTEM

(75) Inventor: Kaku Irisawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/373,192

(22) Filed: Mar. 13, 2006

(65) Prior Publication Data
US 2006/0208207 A1    Sep. 21, 2006

(30) Foreign Application Priority Data
Mar. 15, 2005    (JP) ............................. 2005-072965

(51) Int. Cl.
*G01N 23/04*    (2006.01)
(52) U.S. Cl. .................... 250/580; 250/370.1
(58) Field of Classification Search ................. 250/580
See application file for complete search history.

(56) References Cited
U.S. PATENT DOCUMENTS

| | | | |
|---|---|---|---|
| 6,268,614 B1 | 7/2001 | Imai | |
| 6,373,063 B1 * | 4/2002 | Imai | 250/370.09 |
| 6,469,312 B2 * | 10/2002 | Agano | 250/580 |
| 6,770,901 B1 | 8/2004 | Ogawa et al. | |
| 2003/0136914 A1 * | 7/2003 | Shoji | 250/370.1 |
| 2004/0104362 A1 * | 6/2004 | Imai | 250/582 |
| 2005/0211933 A1 * | 9/2005 | Hakamata et al. | 250/591 |

* cited by examiner

*Primary Examiner*—David Porta
*Assistant Examiner*—Jessica L Eley
(74) *Attorney, Agent, or Firm*—Sughrue Mion, PLLC (57) ABSTRACT

A radiation image detector comprises a first electrode layer, a recording photo-conductor layer, a reading charge-transportable photo-conductor layer, and a second electrode layer. The reading charge-transportable photo-conductor layer generates electric charges when being exposed to reading light. When the reading light is not irradiated, the reading charge-transportable photo-conductor layer acts approximately as an insulator with respect to electric charges having a polarity identical with the polarity of electric charges occurring in the first electrode layer and acts approximately as a conductor with respect to electric charges having a polarity opposite to the polarity of the electric charges occurring in the first electrode layer. Radiation image information is recorded as latent image charges at an interface between the recording photo-conductor layer and the reading charge-transportable photo-conductor layer.

12 Claims, 3 Drawing Sheets

RADIATION IMAGE DETECTOR AND RADIATION IMAGE DETECTING SYSTEM

BACKGROUND OF THE INVENTION

1. Field of the Invention

This invention relates to a radiation image detector capable of generating electric charges in accordance with a quantity of radiation or recording light irradiated to the radiation image detector when the radiation or the recording light, which carries radiation image information, is irradiated to the radiation image detector, the radiation image detector being provided with a charge accumulating section, at which the electric charges having been generated are accumulated as latent image charges, the radiation image detector being capable of detecting the radiation image information through irradiation of reading light to the radiation image detector. This invention also relates to a radiation image detecting system comprising the radiation image detector and reading light irradiating means for irradiating the reading light to the radiation image detector.

2. Description of the Related Art

Various radiation image detecting systems utilizing radiation image detectors have heretofore been proposed and used in practice in medical fields for recording of medical radiation images, and the like. The radiation image detectors utilized in the radiation image detecting systems are capable of generating electric charges in accordance with the quantity of radiation, such as X-rays, which carries radiation image information of an object and is irradiated to the radiation image detectors. The radiation image detectors are capable of accumulating the generated electric charges at charge accumulating sections and are thereby detecting the radiation image information of the object. With the radiation image detecting systems utilizing the radiation image detectors, the radiation image information is recorded by use of the radiation image detectors, and the radiation image information having been recorded in the radiation image detectors is read out as an electric signal.

As examples of the radiation image detectors described above, there have been proposed radiation image detectors, comprising: (i) a first electrode layer, which has transmissivity with respect to radiation for recording or with respect to recording light produced through excitation with the radiation for recording, (ii) a recording photo-conductor layer, which is capable of exhibiting electrical conductivity when it is exposed to the radiation or the recording light, (iii) a charge transporting layer, which acts approximately as an electrical insulator with respect to electric charges having a polarity identical with the polarity of electric charges occurring in the first electrode layer, and which acts approximately as an electrical conductor with respect to electric charges having a polarity opposite to the polarity of the electric charges occurring in the first electrode layer, (iv) a reading photo-conductor layer, which is capable of exhibiting electrical conductivity when it is exposed to reading light, and (v) a second electrode layer having transmissivity with respect to the reading light, the layers being overlaid in this order. With the aforesaid examples of the radiation image detectors, latent image charges carrying radiation image information are accumulated at a charge accumulating section, which is formed at an interface between the recording photo-conductor layer and the charge transporting layer. (The aforesaid examples of the radiation image detectors are described in, for example, U.S. Pat. Nos. 6,268,614 and 6,770,901.)

Also, particularly, there has been proposed a radiation image detector, wherein second electrodes are constituted of a plurality of linear reading electrodes, and wherein the plurality of the linear reading electrodes and a plurality of linear auxiliary electrodes for outputting an electric signal having a level in accordance with the quantity of latent image charges having been accumulated at a charge accumulating section are arrayed alternately and in parallel. The proposed radiation image detector is described in, for example, U.S. Pat. No. 6,770,901. In cases where the second electrodes are constituted as the linear electrodes, the reading light is capable of passing through the regions between adjacent linear electrodes, and therefore the second electrodes need not necessarily have the transmissivity with respect to the reading light.

Heretofore, the radiation image detector described in, for example, U.S. Pat. Nos. 6,268,614 or 6,770,901 has been produced with a process, wherein the reading photo-conductor layer, the charge transporting layer, and the recording photo-conductor layer are overlaid on the plurality of the linear second electrodes, and wherein the first electrode layer is thereafter formed on the recording photo-conductor layer by use of a vacuum evaporation technique. Ordinarily, the reading photo-conductor layer, the charge transporting layer, and the recording photo-conductor layer are overlaid by use of a film forming process. However, the reading photo-conductor layer is a thin film having a thickness of as small as several tens of microns. In cases where the charge transporting layer, which has a markedly small thickness (i.e., a thickness of approximately 0.5 μm), is overlaid on the thin film constituting the reading photo-conductor layer, there is the risk that the smoothness of the charge transporting layer will not be capable of being kept good, and that the reliability of the radiation image detector will not be capable of being kept high. In particular, it may often occurs that the temperature, at which the charge transporting layer is formed, is higher than the temperature, at which the reading photo-conductor layer is formed. In such cases, the problems occur in that the smoothness of the charge transporting layer becomes bad, the charge transportability becomes low, and therefore the reliability of the radiation image detector becomes low.

SUMMARY OF THE INVENTION

The primary object of the present invention is to provide a radiation image detector, which is capable of being produced with a simple film forming process and which has a high reliability.

Another object of the present invention is to provide a radiation image detecting system, which utilizes the radiation image detector.

A further object of the present invention is to provide a radiation image detecting system, wherein radiation image information having been recorded in the radiation image detector is capable of being read out quickly from the radiation image detector.

The present invention provides a radiation image detector, comprising:

i) a first electrode layer, which has transmissivity with respect to radiation carrying radiation image information or with,respect to recording light carrying the radiation image information, ii) a recording photo-conductor layer, which is capable of generating electric charges in accordance with a quantity of the radiation or the recording light irradiated to the recording photo-conductor layer when the radiation or the recording light having passed through the first electrode layer is irradiated to the recording photo-conductor layer, iii) a reading charge-transportable photo-conductor layer, which is capable of generating electric charges when reading light is irradiated to the reading charge-transportable photo-conductor layer, and which is capable of operating at a stage other than the stage of the irradiation of the reading light to the reading charge-transportable photo-conductor layer, such that the reading charge-transportable photo-conductor layer acts approximately as an electrical insulator with respect to electric charges having a polarity identical with the polarity of the electric charges occurring in the first electrode layer, and such that the reading charge-transportable photo-conductor layer acts approximately as an electrical conductor with respect to electric charges having a polarity opposite to the polarity of the electric charges occurring in the first electrode layer, and iv) a second electrode layer, which has transmissivity with respect to the reading light, the radiation image information being recorded as latent image charges at a charge accumulating section, which is formed at an interface between the recording photo-conductor layer and the reading charge-transportable photo-conductor layer.

The recording light may be any kind of light, which carries the radiation image information of an object. By way of example, the recording light maybe the fluorescence, which is produced by a fluorescent substance when the radiation carrying the radiation image information of the object is irradiated to the fluorescent substance.

The radiation image detector in accordance with the present invention may be modified such that a first blocking photo-conductor layer, which has the transmissivity with respect to the radiation or the recording light, and which is capable of exhibiting electrical conductivity when the radiation or the recording light is irradiated to the first blocking photo-conductor layer, is located between the first electrode layer and the recording photo-conductor layer.

In such cases, the first blocking photo-conductor layer is capable of operating at the stage other than the stage of the irradiation of the radiation or the recording light to the first blocking photo-conductor layer, such that the first blocking photo-conductor layer acts approximately as an electrical insulator.

Also, the radiation image detector in accordance with the present invention may be modified such that a second blocking photo-conductor layer, which has the transmissivity with respect to the reading light, and which is capable of exhibiting electrical conductivity when the reading light is irradiated to the second blocking photo-conductor layer, is located between the second electrode layer and the reading charge-transportable photo-conductor layer.

In such cases, the second blocking photo-conductor layer is capable of operating at the stage other than the stage of the irradiation of the reading light to the second blocking photo-conductor layer, such that the second blocking photo-conductor layer acts approximately as an electrical insulator.

The reading light may have a wavelength falling within the range of 300 nm to 500 nm.

Further, the radiation image detector in accordance with the present invention may be modified such that the reading charge-transportable photo-conductor layer contains an alloy, which contains, as a principal constituent, at least one kind of substance selected from the group consisting of Se, Se—Te, S—Te—As, Se—Te—P, Se—As, and Se—Sb. In such cases, the alloy may contain a small amount of Cl.

The present invention also provides a radiation image detecting system, comprising:

i) a radiation image detector, comprising:

a) a first electrode layer, which has transmissivity with respect to radiation carrying radiation image information or with respect to recording light carrying the radiation image information, b) a recording photo-conductor layer, which is capable of generating electric charges in accordance with a quantity of the radiation or the recording light irradiated to the recording photo-conductor layer when the radiation or the recording light having passed through the first electrode layer is irradiated to the recording photo-conductor layer, c) a reading charge-transportable photo-conductor layer, which is capable of generating electric charges when reading light is irradiated to the reading charge-transportable photo-conductor layer, and which is capable of operating at a stage other than the stage of the irradiation of the reading light to the reading charge-transportable photo-conductor layer, such that the reading charge-transportable photo-conductor layer acts approximately as an electrical insulator with respect to electric charges having a polarity identical with the polarity of the electric charges occurring in the first electrode layer, and such that the reading charge-transportable photo-conductor layer acts approximately as an electrical conductor with respect to electric charges having a polarity opposite to the polarity of the electric charges occurring in the first electrode layer, and d) a second electrode layer, which has transmissivity with respect to the reading light, the radiation image information being recorded as latent image charges at a charge accumulating section, which is formed at an interface between the recording photo-conductor layer and the reading charge-transportable photo-conductor layer, and ii) reading light irradiating means for irradiating the reading light to the side of the reading charge-transportable photo-conductor layer of the radiation image detector, the latent image charges, which have been accumulated at the charge accumulating section of the radiation image detector, being read out through the irradiation of the reading light to the side of the reading charge-transportable photo-conductor layer of the radiation image detector.

The radiation image detecting system in accordance with the present invention may be modified such that the reading light irradiating means irradiates exciting light, which has a wavelength longer than the wavelength of the reading light, simultaneously with the irradiation of the reading light and to a position identical with the position, to which the reading light is irradiated, and the electric charges, which have been generated in the reading charge-transportable photo-conductor layer of the radiation image detector when the reading light has been irradiated to the reading charge-transportable photo-conductor layer, are excited by the irradiation of the exciting light.

The term "having transmissivity with respect to light" as used herein embraces the cases wherein the light is approximately transmitted and the cases wherein part of the light is transmitted.

The reading light may have a wavelength falling within the range of 300 nm to 500 nm. Also, the exciting light may have a wavelength falling within the range of 600 nm to 800 nm.

The radiation image detector in accordance with the present invention comprises: (i) the first electrode layer, which has the transmissivity with respect to the radiation carrying the radiation image information or with respect to the recording light carrying the radiation image information, (ii) the recording photo-conductor layer, which is capable of generating the electric charges in accordance with the quantity of the radiation or the recording light irradiated to the recording photo-conductor layer when the radiation or the recording light having passed through the first electrode layer is irradiated to the recording photo-conductor layer, (iii) the reading charge-transportable photo-conductor layer, which is capable of generating the electric charges when the reading light is irradiated to the reading charge-transportable photo-conductor layer, and which is capable of operating at the stage other than the stage of the irradiation of the reading light to the reading charge-transportable photo-conductor layer, such that the reading charge-transportable photo-conductor layer acts approximately as the electrical insulator with respect to the electric charges having the polarity identical with the polarity of the electric charges occurring in the first electrode layer, and such that the reading charge-transportable photo-conductor layer acts approximately as the electrical conductor with respect to the electric charges having the polarity opposite to the polarity of the electric charges occurring in the first electrode layer, and (iv) the second electrode layer, which has the transmissivity with respect to the reading light. Therefore, with the radiation image detector in accordance with the present invention, a film forming process for overlaying a recording photo-conductor layer on a charge transporting layer, which film forming process has heretofore been necessary, need not be performed. Accordingly, the radiation image detector in accordance with the present invention is capable of being produced easily. Also, with the radiation image detector in accordance with the present invention, a film forming process for overlaying a charge transporting layer, which is ordinarily formed at a temperature higher than the film forming temperature of a reading photo-conductor layer, on the reading photo-conductor layer need not be performed. Therefore, the reliability of the radiation image detector is capable of being enhanced.

Further, the radiation image detector in accordance with the present invention may be modified such that the first blocking photo-conductor layer, which is capable of operating at the stage other than the stage of the irradiation of the radiation or the recording light to the first blocking photo-conductor layer, such that the first blocking photo-conductor layer acts approximately as the electrical insulator, is located between the first electrode layer and the recording photo-conductor layer. With the modification described above, at a stage in which a recording voltage is being applied across the radiation image detector and in which the radiation or the recording light is not irradiated to the radiation image detector, the problems are capable of being reliably prevented from occurring in that negative charges are injected from the first electrode layer into the recording photo-conductor layer. Therefore, the reliability of the radiation image detector is capable of being enhanced even further.

Furthermore, the radiation image detector in accordance with the present invention may be modified such that the second blocking photo-conductor layer, which is capable of operating at the stage other than the stage of the irradiation of the reading light to the second blocking photo-conductor layer, such that the second blocking photo-conductor layer acts approximately as the electrical insulator, is located between the second electrode layer and the reading charge-transportable photo-conductor layer. With the modification described above, at the stage in which the recording voltage is being applied across the radiation image detector, the problems are capable of being reliably prevented from occurring in that positive charges are injected from the second electrode layer into the reading charge-transportable photo-conductor layer. Therefore, the reliability of the radiation image detector is capable of being enhanced even further.

Also, the radiation image detector in accordance with the present invention may be modified such that the reading charge-transportable photo-conductor layer contains the alloy, which contains, as the principal constituent, at least one kind of substance selected from the group consisting of Se, Se—Te, Se—Te—As, Se—Te—P, Se—As, and Se—Sb. In such cases, the alloy has a glass transition temperature higher than an environmental temperature at which the radiation image detector is ordinarily used. Therefore, the radiation image detector need not be provided with a crystallization preventing film, and a heat stability of the radiation image detector is capable of being enhanced.

The radiation image detecting system in accordance with the present invention comprises: (i) the radiation image detector and (ii) the reading light irradiating means. The radiation image detector comprises: (a) the first electrode layer, which has the transmissivity with respect to the radiation carrying the radiation image information or with respect to the recording light carrying the radiation image information, (b) the recording photo-conductor layer, which is capable of generating the electric charges in accordance with the quantity of the radiation or the recording light irradiated to the recording photo-conductor layer when the radiation or the recording light having passed through the first electrode layer is irradiated to the recording photo-conductor layer, (c) the reading charge-transportable photo-conductor layer, which is capable of generating the electric charges when the reading light is irradiated to the reading charge-transportable photo-conductor layer, and which is capable of operating at the stage other than the stage of the irradiation of the reading light to the reading charge-transportable photo-conductor layer, such that the reading charge-transportable photo-conductor layer acts approximately as the electrical insulator with respect to the electric charges having the polarity identical with the polarity of the electric charges occurring in the first electrode layer, and such that the reading charge-transportable photo-conductor layer acts approximately as the electrical conductor with respect to the electric charges having the polarity opposite to the polarity of the electric charges occurring in the first electrode layer, and (d) the second electrode layer, which has the transmissivity with respect to the reading light. The radiation image information is recorded as the latent image charges at the charge accumulating section, which is formed at the interface between the recording photo-conductor layer and the reading charge-transportable photo-conductor layer. The reading light irradiating means irradiates the reading light to the side of the reading charge-transportable photo-conductor layer of the radiation image detector. The latent image charges, which have been accumulated at the charge accumulating section of the radiation image detector, are read out through the irradiation of the reading light to the side of the reading charge-transportable photo-conductor layer of the radiation image detector. Therefore, with the radiation image detecting system in accordance with the present invention, the radiation image information is capable of being detected by use of the radiation image detector, which is capable of being produced easily and which has the enhanced reliability.

The radiation image detecting system in accordance with the present invention may be modified such that the reading light irradiating means irradiates the exciting light, which has the wavelength longer than the wavelength of the reading light, simultaneously with the irradiation of the reading light and to the position identical with the position, to which the reading light is irradiated, and such that the electric charges, which have been generated in the reading charge-transportable photo-conductor layer of the radiation image detector when the reading light has been irradiated to the reading charge-transportable photo-conductor layer, are excited by the irradiation of the exciting light. With the modification described above, combination of the electric charges, which have been generated in the reading charge-transportable photo-conductor layer, and the latent image charges, which have been recorded at the charge accumulating section, with each other is capable of being promoted. Therefore, the speed, with which the radiation image information having been recorded is read out, is capable of being kept high.

DESCRIPTION OF THE PREFERRED EMBODIMENTS

The present invention will hereinbelow be described in further detail with reference to the accompanying drawings.

Figure 1:
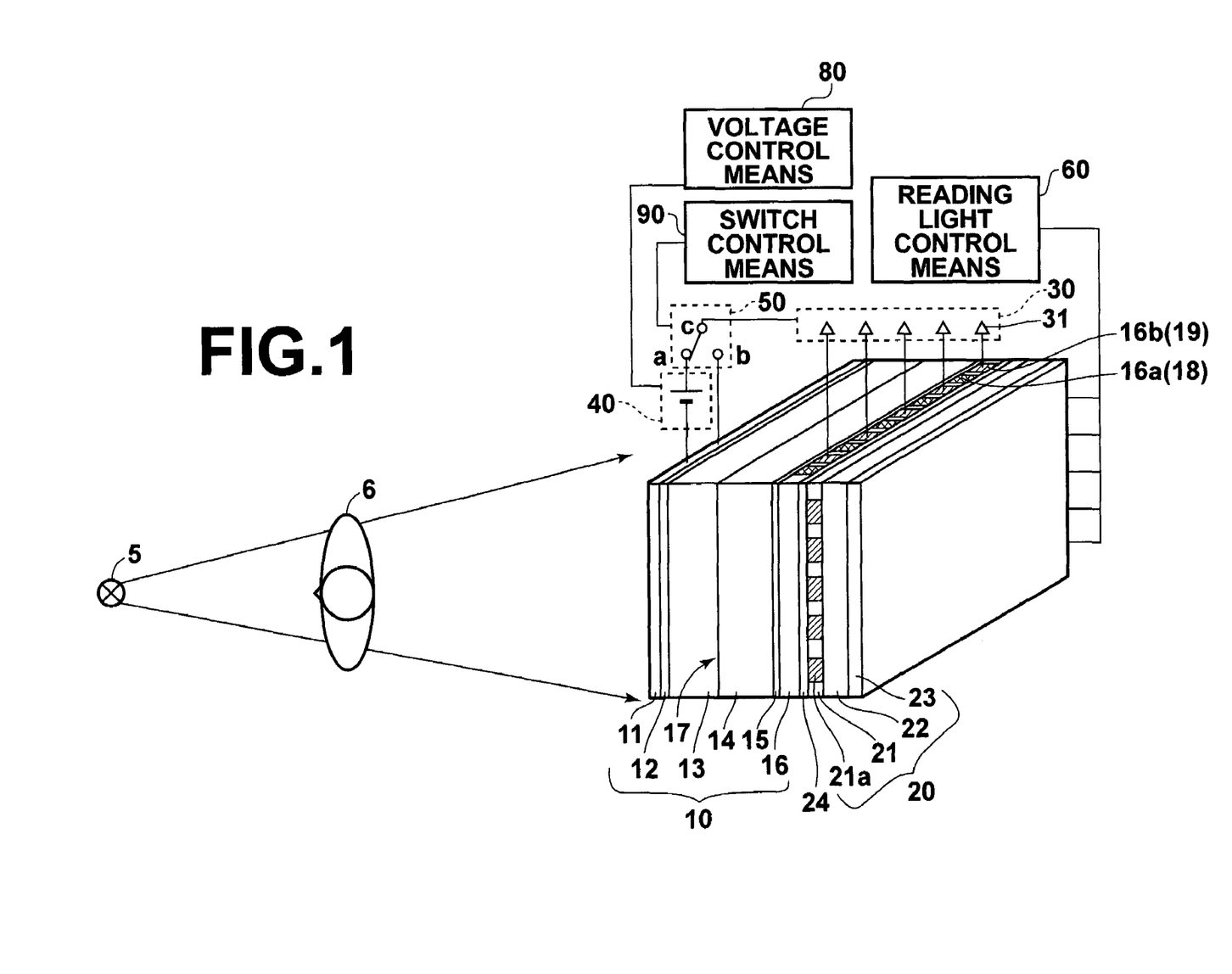
FIG. 1 is a schematic view showing a radiation image recording and read-out apparatus, in which an embodiment of the radiation image detecting system in accordance with the present invention is employed.

FIG. 1 is a schematic view showing a radiation image recording and read-out apparatus, in which an embodiment of the radiation image detecting system in accordance with the present invention is employed.

With reference to FIG. 1, the radiation image recording and read-out apparatus comprises a radiation source 5 for radiating out radiation L1. The radiation image recording and read-out apparatus also comprises a radiation image detector 10, which is capable of recording radiation image information of an object 6 when the radiation L1 having been radiated out from the radiation source 5 and carrying the radiation image information of the object 6 is irradiated to the radiation image detector 10, and from which the radiation image information having been recorded is capable of being detected. The radiation image recording and read-out apparatus further comprises a surface-shaped light source 20 for irradiating reading light L2 to the radiation image detector 10 when the radiation image information having been recorded in the radiation image detector 10 is to be readout from the radiation image detector 10. The radiation image recording and read-out apparatus still further comprises a current detecting section 30 provided with a plurality of charge amplifiers 31, 31, . . . for the detection of electric currents, which have been generated in the radiation image detector 10 when the reading light L2 is irradiated from the surface-shaped light source 20 to the radiation image detector 10. The radiation image recording and read-out apparatus also comprises a voltage source 40 for applying a voltage across the radiation image detector 10 when the radiation image information is to be recorded in the radiation image detector 10. The radiation image recording and read-out apparatus further comprises short-circuiting means 50 for short-circuiting a first electrode layer 11 and a second electrode layer 16, which will be described later, of the radiation image detector 10 when the radiation image information having been recorded in the radiation image detector 10 is to be read out as the electric currents from the radiation image detector 10. The radiation image recording and read-out apparatus still further comprises reading light control means 60 for controlling the operation of the surface-shaped light source 20. The radiation image recording and read-out apparatus also comprises voltage control means 80 for controlling the operation of the voltage source 40. The radiation image recording and read-out apparatus further comprises switch control means 90 for controlling the operation of the short-circuiting means 50.

The radiation image detector 10 comprises the first electrode layer 11, which has the transmissivity with respect to the radiation L1 carrying the radiation image information of the object 6. The radiation image detector 10 also comprises a first blocking photo-conductor layer 12, which has the transmissivity with respect to the radiation L1, and which is capable of exhibiting the electrical conductivity when the radiation L1 having passed through the first electrode layer 11 is irradiated to the first blocking photo-conductor layer 12. The first blocking photo-conductor layer 12 is capable of operating at the stage other than the, stage of the irradiation of the radiation L1 to the first blocking photo-conductor layer 12, such that the first blocking photo-conductor layer 12 acts approximately as the electrical insulator. The radiation image detector 10 further comprises a recording photo-conductor layer 13, which is capable of generating the electric charges in accordance with the quantity of the radiation L1 irradiated to the recording photo-conductor layer 13 when the radiation L1 having passed through the first electrode layer 11 is irradiated to the recording photo-conductor layer 13. The radiation image detector 10 still further comprises a reading charge-transportable photo-conductor layer 14, which is capable of generating the electric charges when the reading light L2 is irradiated to the reading charge-transportable photo-conductor layer 14. The reading charge-transportable photo-conductor layer 14 is also capable of operating at the stage other than the stage of the irradiation of the reading light L2 to the reading charge-transportable photo-conductor layer 14, such that the reading charge-transportable photo-conductor layer 14 acts approximately as the electrical insulator with respect to latent image charges, which have been generated in the recording photo-conductor layer 13, and such that the reading charge-transportable photo-conductor layer 14 acts approximately as the electrical conductor with respect to transported charges, which has the polarity opposite to the polarity of the latent image charges. The radiation image detector 10 also comprises a second blocking photo-conductor layer 15, which has the transmissivity with respect to the reading light L2, and which is capable of exhibiting the electrical conductivity when the reading light L2 is irradiated to the second blocking photo-conductor layer 15. The second blocking photo-conductor layer 15 is capable of operating at the stage other than the stage of the irradiation of the reading light L2 to the second blocking photo-conductor layer 15, such that the second blocking photo-conductor layer 15 acts approximately as the electrical insulator. The radiation image detector 10 further comprises the second electrode layer 16, which has the transmissivity with respect to the reading light L2. The first electrode layer 11, the first blocking photo-conductor layer 12, the recording photo-conductor layer 13, the reading charge-transportable photo-conductor layer 14, the second blocking photo-conductor layer 15, and the second electrode layer 16 are overlaid in this order. A charge accumulating section 17 for accumulating the latent image charges, which have been generated in the recording photo-conductor layer 13, is formed between the recording photo-conductor layer 13 and the reading charge-transportable photo-conductor layer 14.

The first electrode layer 11 may be constituted of one of various materials capable of transmitting the radiation L1. For example, the first electrode layer 11 may be constituted of a tin dioxide film ($SnO_2$), an indium tin oxide (ITO) film, an Idemitsu Indium X-metal Oxide (IDIXO) film (an amorphous light-transmissive oxide film, supplied by Idemitsu Kosan K.K.), or the like, which has a thickness falling within the range of 50 nm to 200 nm. As the first electrode layer 11, an Al film or an Au film having a thickness of 100 nm may also be utilized.

Figure 2A:
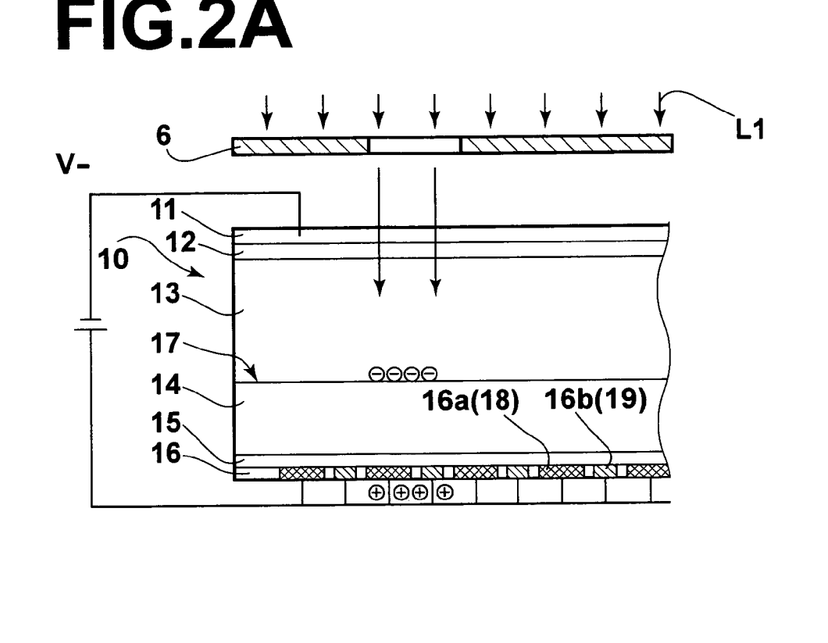
FIG. 2A is an explanatory view showing how radiation image information is recorded in a radiation image detector of the radiation image recording and read-out apparatus shown in FIG. 1.
Figure 2B:
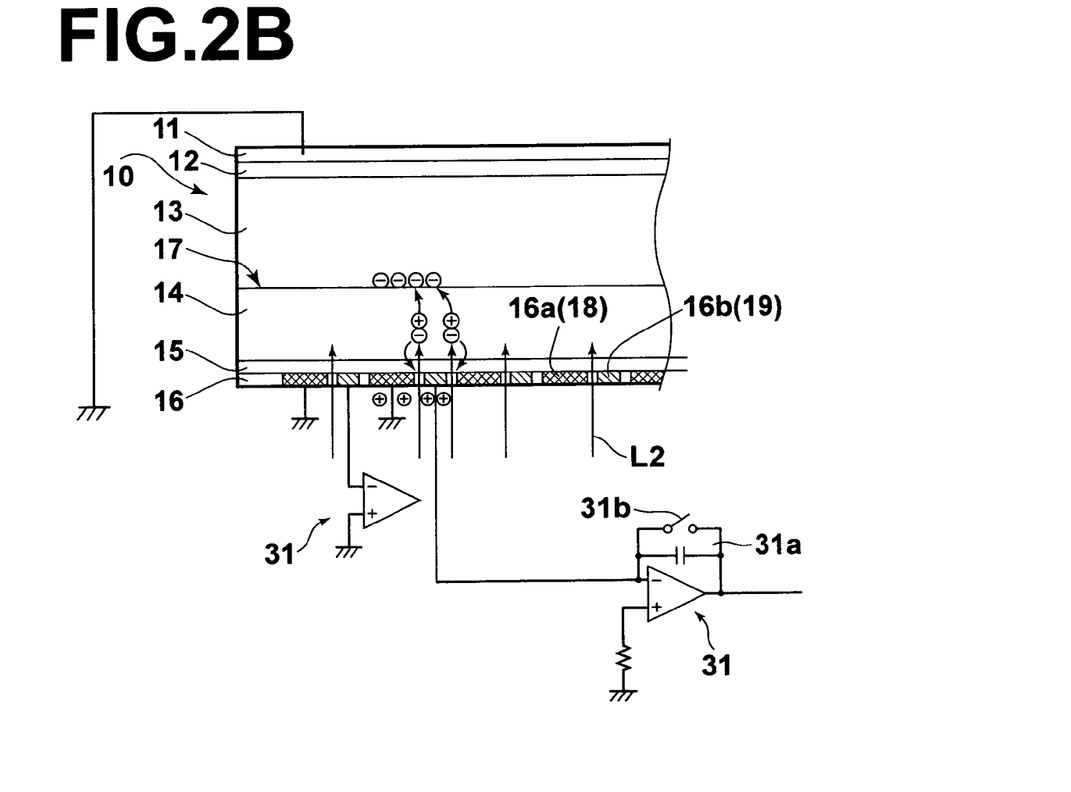
FIG. 2B is an explanatory view showing how the radiation image information having been recorded in the radiation image detector of the radiation image recording and read-out apparatus shown in FIG. 1 is read out from the radiation image detector.

As illustrated in FIG. 1, FIG. 2A, and FIG. 2B, the second electrode layer 16 is provided with a first striped electrode 18, which is constituted of a plurality of first linear electrodes 16a, 16a, . . . The second electrode layer 16 is also provided with a second striped electrode 19, which is constituted of a plurality of second linear electrodes 16b, 16b, . . . Each of the second linear electrodes 16b, 16b, . . . is located between two adjacent first linear electrodes 16a, 16a. The first striped electrode 18 is made from a metal, such as Al or Cr, which is capable of blocking the reading light L2. The second striped electrode 19 is made from a material of the same type as the material of the first electrode layer 11. The second striped electrode 19 has the transmissivity with respect to the reading light L2. Alternatively, the first striped electrode 18 may be made from the material of the same type as the material of the second striped electrode 19 and may then be coated with a metal, such as Al or Cr, which is capable of blocking the reading light L2.

Each of the second linear electrodes 16b, 16b, . . . of the second striped electrode 19 constituting the second electrode layer 16 is connected to one of the charge amplifiers 31, 31, . . . for the detection of the electric charges, which have been read through the corresponding second linear electrodes 16b, 16b, . . . (In FIG. 2A, the charge amplifiers 31, 31, . . . are not shown.)

The recording photo-conductor layer 13 may be constituted of one of various materials, which are capable of generating the electric charges when being exposed to the radiation L1. In this embodiment, the recording photo-conductor layer 13 is constituted of an alloy, which contains a-Se as the principal constituent. The alloy, which contains a-Se as the principal constituent, has the advantages in that a quantum efficiency is comparatively high with respect to the radiation L1 and in that a dark resistance is high. The thickness of the alloy, which contains a-Se as the principal constituent and constitutes the recording photo-conductor layer 13, may be approximately 500 μm.

The reading charge-transportable photo-conductor layer 14 may be constituted of one of various materials having the characteristics such that the difference between the mobility of the electric charges, which occur in the first electrode layer 11, and the mobility of the electric charges, which have the polarity opposite to the polarity of the electric charges occurring in the first electrode layer 11, is as large as possible (e.g., at least $10^2$, and preferably at least $10^3$), and such that the materials exhibit the photo-conductivity for generating the electric charges when being exposed to the reading light L2. By way of example, the reading charge-transportable photo-conductor layer 14 should preferably contain an alloy, which contains, as a principal constituent, at least one kind of substance selected from the group consisting of Se, Se—Te, Se—Te—As, Se—Te—P, Se—As, and Se—Sb. In such cases, the alloy may contain a small amount of Cl.

The radiation image detector 10 is not limited to the layer constitution described above and may contain other layers. Also, the layers constituting the radiation image detector 10 may be constituted of materials other than those described above, which materials have the effects equivalent to the effects of the layers described above.

As illustrated in FIG. 1, the radiation image detector 10 having the constitution described above is associated with the surface-shaped light source 20. The surface-shaped light source 20 is located on the side of the second electrode layer 16 of the radiation image detector 10. The surface-shaped light source 20 is an electroluminescence device (i.e., an EL device), which comprises a first electrically conductive layer 21, an EL layer 22, and a second electrically conductive layer 23. An electrical insulation layer 24 is located between the second electrode layer 16 of the radiation image detector 10 and the first electrically conductive layer 21 of the surface-shaped light source 20.

The first electrically conductive layer 21 of the surface-shaped light source 20 is provided with a plurality of linear electrodes 21a, 21a, . . . , which are arrayed inparallel with one another. The linear electrodes 21a, 21a, . . . of the surface-shaped light source 20 are located so as to intersect orthogonally with the second linear electrodes 16b, 16b, . . . of the second electrode layer 16 of the radiation image detector 10. Specifically, the linear electrodes 21a, 21a, . . . , the EL layer 22, and the second electrically conductive layer 23 co-operate to constitute a plurality of line-like light sources, which are arrayed so as to stand side by side with one another with respect to the longitudinal direction of each of the second linear electrodes 16b, 16b, . . . of the second electrode layer 16. In cases where the matching with a-Se, which may be employed as the principal constituent of the reading charge-transportable photo-conductor layer 14 of the radiation image detector 10, is taken into consideration, the EL layer 22 may be constituted of a material capable of producing EL light having a wavelength of approximately 470 nm. Also, each of the linear electrodes 21a, 21a, . . . of the first electrically conductive layer 21 is made from a material, which has the transmissivity with respect to the EL light. Further, the region located between adjacent linear electrodes 21a, 21a may be made from a material, which is capable of electrically isolating the adjacent linear electrodes 21a, 21a from each other and which has the transmissivity with respect to the EL light. Alternatively, the region located between the adjacent linear electrodes 21a, 21a may be made from a material, which is capable of electrically isolating the adjacent linear electrodes 21a, 21a from each other and which is capable of blocking the EL light.

Each of the linear electrodes 21a, 21a, ... of the surface-shaped light source 20 is connected to the reading light control means 60. The reading light control means 60 applies a predetermined voltage across each of the linear electrodes 21a, 21a, ... of the surface-shaped light source 20 and the second electrically conductive layer 23, which stands facing each of the linear electrodes 21a, 21a, ... The reading light control means 60 thus controls the irradiation with the reading light L2. Byway of example, the reading light control means 60 applies a predetermined d.c. voltage across each of the linear electrodes 21a, 21a, ... and the second electrically conductive layer 23. The voltage application is performed by successively changing over the linear electrodes 21a, 21a, ... By the application of the d.c. voltage, the EL light is produced by the region of the EL layer 22, which region is sandwiched between each linear electrode 21a and the second electrically conductive layer 23. The EL light having thus been produced passes through the linear electrode 21a and is utilized as the line-like reading light L2. With respect to the entire area of each of the second linear electrodes 16b, 16b, ... of the second electrode layer 16, which area extends from one end of each second linear electrode 16b to the other end of the second linear electrode 16b, the ends being taken with respect to the longitudinal direction of the second linear electrode 16b, the linear electrodes 21a, 21a, ... are thus successively changed over, and the EL light is successively produced by each of the regions of the EL layer 22, which regions are sandwiched between the linear electrodes 21a, 21a, ... and the second electrically conductive layer 23. As a result, the entire area of the second electrode layer 16 is scanned with the line-like reading light L2. The longitudinal direction of each of the second linear electrodes 16b, 16b, ... of the second electrode layer 16 corresponds to a sub-scanning direction, and the direction, along which the line-like reading light L2 extends, corresponds to a main scanning direction.

The voltage on-off operations of the voltage source 40 and the magnitude of the voltage applied by the voltage source 40 are controlled by the voltage control means 80, which is connected to the voltage source 40.

The current detecting section 30 is provided with the plurality of the charge amplifiers 31, 31, ..., each of which is connected to one of the second linear electrodes 16b, 16b, of the second electrode layer 16.

The short-circuiting means 50 is constituted of a switch. As illustrated in FIG. 1, a terminal on a positive pole side of the voltage source 40 is connected to a terminal "a" of the switch constituting the short-circuiting means 50. Also, the first electrode layer 11 of the radiation image detector 10 is connected to a terminal "b" of the switch constituting the short-circuiting means 50. Further, the charge amplifiers 31, 31, ... of the current detecting section 30 are connected to a terminal "c" of the switch constituting the short-circuiting means 50. The connection of the switch constituting the short-circuiting means 50 is changed over at the time of the recording of the radiation image information in the radiation image detector 10 and at the time of the readout of the radiation image information from the radiation image detector 10. The change-over of the connection of the switch constituting the short-circuiting means 50 is controlled by the switch control means 90, which is connected to the short-circuiting means 50.

The light source for irradiating the reading light to the radiation image detector 10 is not limited to the surface-shaped light source 20 and may be replaced by a different light source, which is capable of irradiating the reading light to the entire area of the surface of the radiation image detector 10. By way of example, a linear light source extending in the main scanning direction may be moved in the sub-scanning direction, and the reading light produced by the linear light source may thus be irradiated successively to the entire area of the surface of the radiation image detector 10. Alternatively, a light beam having been produced by a beam light source may be caused to scan the entire area of the surface of the radiation image detector 10 in the main scanning direction and in the sub-scanning direction.

How the radiation image information is recorded in the radiation image detector 10 of the aforesaid embodiment of the radiation image detecting system employed in the radiation image recording and read-out apparatus and is read out from the radiation image detector 10 will be described hereinbelow. FIG. 2A is an explanatory view showing how the radiation image information is recorded in the radiation image detector 10 of the radiation image recording and read-out apparatus shown in FIG. 1. FIG. 2B is an explanatory view showing how the radiation image information having been recorded in the radiation image detector 10 of the radiation image recording and read-out apparatus shown in FIG. 1 is read out from the radiation image detector 10.

As illustrated in FIG. 2A, in cases where the radiation image information is to be recorded in the radiation image detector 10, the voltage source 40 is controlled by the voltage control means 80, and the recording voltage is applied across the first electrode layer 11 and the second electrode layer 16 of the radiation image detector 10. The magnitude of the recording voltage applied at this time is approximately 5 kV. The recording voltage is applied such that the first electrode layer 11 is set at a negative potential, and such that the second electrode layer 16 is set at a positive potential. Also, after the recording voltage has thus been applied across the first electrode layer 11 and the second electrode layer 16 of the radiation image detector 10, the radiation L1 is radiated out from the radiation source 5, and the radiation L1 carrying the radiation image information of an object 6 is irradiated to the radiation image detector 10. As a result, pairs of positive and negative charges are generated in the recording photo-conductor layer 13 of the radiation image detector 10. Of the pairs of positive and negative charges having been generated in the recording photo-conductor layer 13 of the radiation image detector 10 in the manner described above, the positive charges move toward the first electrode layer 11 having been charged negatively and disappear through combination with the negative charges having occurred in the first electrode layer 11. Also, of the pairs of positive and negative charges having been generated in the recording photo-conductor layer 13 of the radiation image detector 10 in the manner described above, the negative charges move toward the second electrode layer 16 having been charged positively. However, the reading charge-transportable photo-conductor layer 14 is capable of operating at the stage other than the stage of the irradiation of the reading light L2 to the reading charge-transportable photo-conductor layer 14, such that the reading charge-transportable photo-conductor layer 14 acts approximately as the electrical insulator with respect to the negative charges, which have been generated in the recording photo-conductor layer 13. Therefore, as illustrated in FIG. 2A, the negative charges, which have been generated in the recording photo-conductor layer 13 and have moved through the recording photo-conductor layer 13 toward the second electrode layer 16, are accumulated at the charge accumulating section 17 formed at the interface between the recording photo-conductor layer 13 and the reading charge-transportable photo-conductor layer 14. These negative charges are also accumulated in a charge trap within the bulk of the reading charge-transportable photo-conductor layer 14. In this embodiment, the application of the recording voltage across the first electrode layer 11 and the second electrode layer 16 of the radiation image detector 10 and the irradiation of the radiation L1 to the radiation image detector 10 are performed for a period of approximately is. Also, the first blocking photo-conductor layer 12 is located between the first electrode layer 11 and the recording photo-conductor layer 13. Therefore, by the effect of the first blocking photo-conductor layer 12, at the stage in which the recording voltage is being applied across the first electrode layer 11 and the second electrode layer 16 of the radiation image detector 10 and in which the radiation L1 is not irradiated to the radiation image detector 10, the problems are capable of being reliably prevented from occurring in that the negative charges are injected from the first electrode layer 11 into the recording photo-conductor layer 13. In cases where the radiation L1 is irradiated to the first blocking photo-conductor layer 12, the first blocking photo-conductor layer 12 exhibits the electrical conductivity. Therefore, the first blocking photo-conductor layer 12 does not obstruct the movement of the positive charges from the recording photo-conductor layer 13 toward the first electrode layer 11. Further, the second blocking photo-conductor layer 15 is located between the second electrode layer 16 and the reading charge-transportable photo-conductor layer 14. Therefore, by the effect of the second blocking photo-conductor layer 15, at the stage in which the recording voltage is being applied across the first electrode layer 11 and the second electrode layer 16 of the radiation image detector 10, the problems are capable of being reliably prevented from occurring in that the positive charges are injected from the second electrode layer 16 into the reading charge-transportable photo-conductor layer 14.

How the radiation image information having been recorded in the radiation image detector 10 in the manner described above is read out from the radiation image detector 10 will be described hereinbelow. As illustrated in FIG. 2B, the first electrode layer 11 and the first linear electrodes 16a, 16a, . . . of the second electrode layer 16 are grounded. Also, each of the second linear electrodes 16b, 16b, . . . of the second electrode layer 16 is connected to the corresponding one of the charge amplifiers 31, 31, . . . of the current detecting section 30. Further, the reading light control means 60 applies the predetermined d.c. voltage across each of the linear electrodes 21a, 21a, . . . and the second electrically conductive layer 23 of the surface-shaped light source 20. The voltage application is performed by successively changing over the linear electrodes 21a, 21a, . . . By the application of the d.c. voltage, the reading light L2 is produced by the region of the EL layer 22, which region is sandwiched between each linear electrode 21a and the second electrically conductive layer 23. The entire area of the surface of the radiation image detector 10 is thus scanned with the reading light L2, which has thus been emitted from the EL layer 22. When the reading light L2 is irradiated to the radiation image detector 10 in the manner described above, the reading light L2 passes through each of the second linear electrodes 16b, 16b, . . . of the second electrode layer 16 and through the second blocking photo-conductor layer 15 and impinges upon the reading charge-transportable photo-conductor layer 14. As a result, as illustrated in FIG. 2B, pairs of positive and negative charges are generated in the reading charge-transportable photo-conductor layer 14. The reading light L2, which has a wavelength of 470 nm, does not enter deeply into the reading charge-transportable photo-conductor layer 14. Therefore, the pairs of positive and negative charges are generated principally in the region of the reading charge-transportable photo-conductor layer 14, which region is located on the side of the second electrode layer 16.

Of the pairs of positive and negative charges, which have been generated in the reading charge-transportable photo-conductor layer 14 in the manner described above, the positive charges move through the reading charge-transportable photo-conductor layer 14 toward the charge accumulating section 17 and disappear through combination with the negative charges, which have been accumulated at the charge accumulating section 17. A portion of these positive charges also combine with the negative charges, which are accumulated in the charge trap within the bulk of the reading charge-transportable photo-conductor layer 14. Also, of the pairs of positive and negative charges, which have been generated in the reading charge-transportable photo-conductor layer 14 in the manner described above, the negative charges move toward the positive charges, which have been formed in the second electrode layer 16. The negative charges, which have thus moved toward the positive charges of the second electrode layer 16, combine with the positive charges having been formed in each of the second linear electrodes 16b, 16b, . . . of the second electrode layer 16. The negative charges, which have moved toward the positive charges of the second electrode layer 16, also combine with the positive charges having been formed in each of the first linear electrodes 16a, 16a, . . . via the charge amplifier 31. In this manner, the electric charges are accumulated at a capacitor 31a of the charge amplifier 31. Also, switches 31b, 31b, . . . of the charge amplifiers 31, 31, . . . are successively switched with a predetermined timing in accordance with the scanning of the reading light L2, and electric signal components corresponding to pixels constituting the radiation image information are thereby successively outputted from the charge amplifiers 31, 31, . . . .

As clear from the foregoing, in cases where the radiation image detector 10 utilized in this embodiment of the radiation image detecting system employed in the radiation image recording and read-out apparatus is to be produced, a film forming process for overlaying a recording photo-conductor layer on a charge transporting layer, which film forming process has heretofore been necessary for the production of a conventional radiation image detector, need not be performed. Accordingly, the radiation image detector 10 utilized in this embodiment of the radiation image detecting system employed in the radiation image recording and read-out apparatus is capable of being produced easily. Also, with the radiation image detector 10 utilized in this embodiment of the radiation image detecting system employed in the radiation image recording and read-out apparatus, a film forming process for overlaying a charge transporting layer, which is ordinarily formed at a temperature higher than the film forming temperature of a reading photo-conductor layer, on the reading photo-conductor layer need not be performed. Therefore, the reliability of the radiation image detector is capable of being enhanced.

Also, the reading charge-transportable photo-conductor layer 14 may contain the alloy, which contains, as the principal constituent, at least one kind of substance selected from the group consisting of Se, Se—Te, Se—Te—As, Se—Te—P, Se—As, and Se—Sb. In such cases, the alloy has a glass transition temperature higher than an environmental temperature at which the radiation image detector is ordinarily used. Therefore, the radiation image detector need not be provided with a crystallization preventing film, and a heat stability of the radiation image detector is capable of being enhanced.

Figure 3:
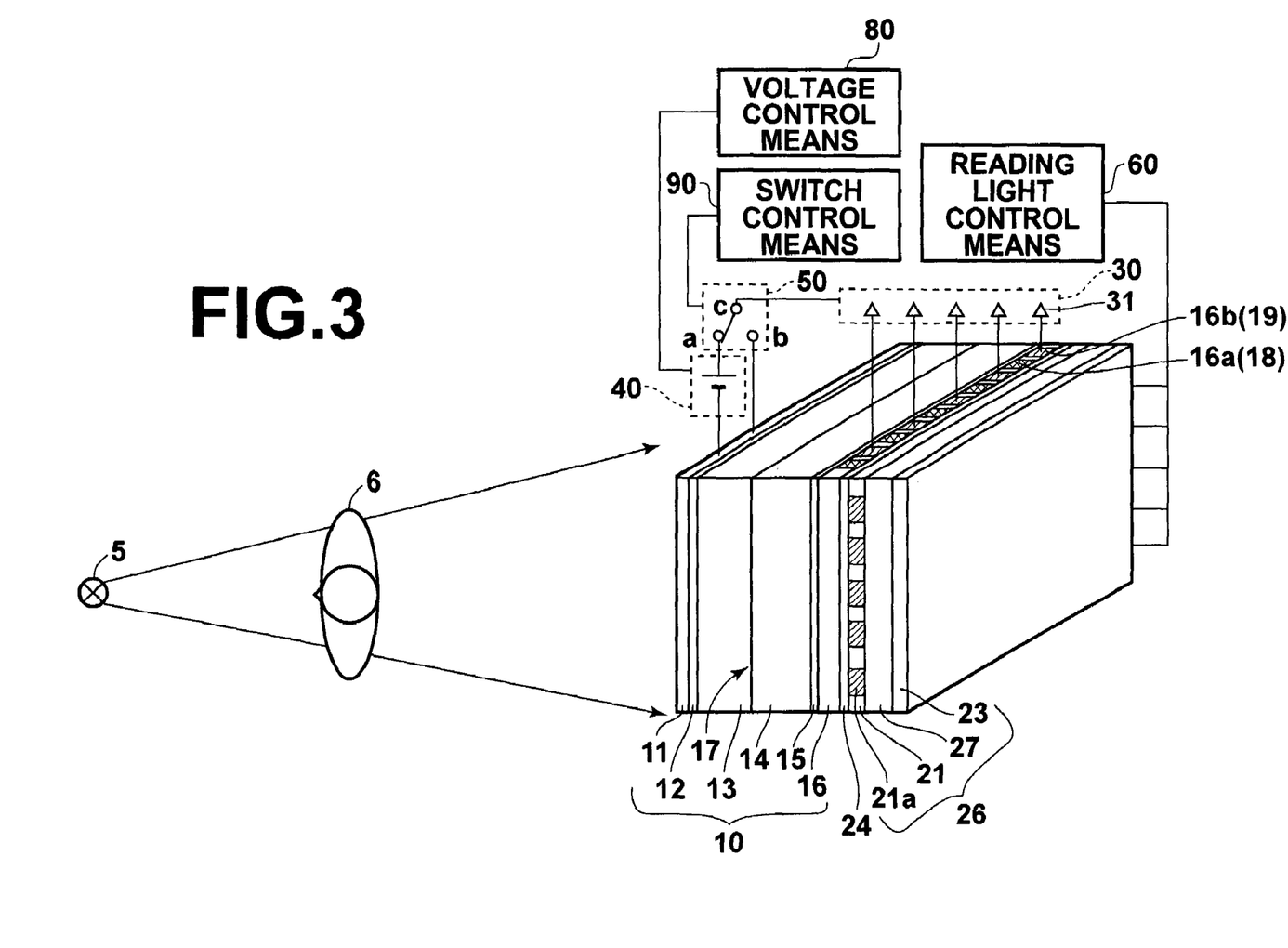
FIG. 3 is a schematic view showing a radiation image recording and read-out apparatus, in which a different embodiment of the radiation image detecting system in accordance with the present invention is employed.

In the embodiment described above, the surface-shaped light source 20, which radiates out the reading light L2 having a wavelength of 470 nm, is employed. FIG. 3 is a schematic view showing a radiation image recording and read-out apparatus, in which a different embodiment of the radiation image detecting system in accordance with the present invention is employed. In FIG. 3, similar elements are numbered with the same reference numerals with respect to FIG. 1. As illustrated in FIG. 3, in lieu of the surface-shaped light source 20, a surface-shaped light source 26 may be employed. In lieu of the aforesaid EL layer 22, which radiates out the reading light L2 having a wavelength of 470 nm, the surface-shaped light source 26 is provided with an EL layer 27, which radiates out the reading light L2 having a wavelength of 470 nm and exciting light having a wavelength of 750 nm. In such cases, at the time of the readout of the radiation image information from the radiation image detector 10, both the reading light L2 having a wavelength of 470 nm and the exciting light having a wavelength of 750 nm are irradiated together to the reading charge-transportable photo-conductor layer 14. Therefore, the positive charges, which have been generated in the reading charge-transportable photo-conductor layer 14, are capable of being excited by the exciting light, and the time required for the positive charges, which have been generated in the reading charge-transportable photo-conductor layer 14, to pass through the reading charge-transportable photo-conductor layer 14 and to disappear through combination with the negative charges having been accumulated at the charge accumulating section 17 is capable of being kept short. Also, the exciting light, which has a wavelength of 750 nm, is capable of traveling to the region in the vicinity of the charge accumulating section 17. Therefore, the problems are capable of being prevented from occurring in that the positive charges, which have passed through the reading charge-transportable photo-conductor layer 14, are trapped at the interface between the reading charge-transportable photo-conductor layer 14 and the recording photo-conductor layer 13. Accordingly, a residual image phenomenon is capable of being suppressed. The wavelength of the exciting light is not limited to 750 nm. It is sufficient for the exciting light to be light having a wavelength, such that the exciting light is capable of passing through the second electrode layer 16 and the second blocking photo-conductor layer 15 and is capable of exciting the positive charges, which have been generated in the reading charge-transportable photo-conductor layer 14. Further, as the surface-shaped light source 26, by way of example, it is possible to employ a light source comprising an EL layer, which radiates out the reading light L2 having a wavelength of 470 nm, and an EL layer, which radiates out the exciting light having a wavelength of 750 nm. Alternatively, as the surface-shaped light source 26, it is possible to employ a light source, wherein line-like EL layers, which radiate out the reading light L2 having a wavelength of 470 nm, and line-like EL layers, which radiate out the exciting light having a wavelength of 750 nm, are located alternately, and wherein the reading light L2 and the exciting light are superposed one upon the other by use of optical means.

In lieu of the surface-shaped light source 20 or the surface-shaped light source 26, the light source for radiating out the light for the readout of the radiation image information maybe of one of various other light sources, such as a line-like light source and a beam light source, which are constituted such that the light is capable of being irradiated to the entire area of the surface of the radiation image detector 10.

What is claimed is:

1. A radiation image detector, comprising:
    i) a first electrode layer, which has transmissivity with respect to radiation carrying radiation image information or with respect to recording light carrying the radiation image information,
    ii) a recording photo-conductor layer, which is capable of generating electric charges in accordance with a quantity of the radiation or the recording light irradiated to the recording photo-conductor layer when the radiation or the recording light having passed through the first electrode layer is irradiated to the recording photo-conductor layer,
    iii) a single reading charge-transportable photo-conductor layer, which is capable of generating electric charges when reading light is irradiated to the reading charge-transportable photo-conductor layer, and which is capable of operating at a stage other than the stage of the irradiation of the reading light to the reading charge-transportable photo-conductor layer, such that the reading charge-transportable photo-conductor layer acts substantially as an electrical insulator with respect to electric charges having a polarity identical with the polarity of the electric charges occurring in the first electrode layer, and such that the reading charge-transportable photo-conductor layer acts substantially as an electrical conductor with respect to electric charges having a polarity opposite to the polarity of the electric charges occurring in the first electrode layer, and
    iv) a second electrode layer, which has transmissivity with respect to the reading light,
    the radiation image information being recorded as latent image charges at a charge accumulating section, which is formed at an interface between the recording photo-conductor layer and the reading charge-transportable photo-conductor layer.

2. A radiation image detector as defined in claim 1 wherein a second blocking photo-conductor layer, which has the transmissivity with respect to the reading light and which is capable of exhibiting electrical conductivity when the reading light is irradiated to the second blocking photo-conductor layer, is located between the second electrode layer and the reading charge-transportable photo-conductor layer.

3. A radiation image detector as defined in claim 2 wherein the reading charge-transportable photo-conductor layer contains an alloy, which contains, as a principal constituent, at least one kind of substance selected from the group consisting of Se, Se—Te, Se—Te—As, Se—Te—P, Se—As, and Se—Sb and said alloy contains an amount of Cl.

4. A radiation image detector as defined in claim 1 wherein the reading charge-transportable photo-conductor layer contains an alloy, which contains, as a principal constituent, at least one kind of substance selected from the group consisting of Se, Se—Te, Se—Te—As, Se—Te—P, Se—As, and Se—Sb and said alloy contains a small amount of Cl.

5. The detector of claim 1 wherein the second electrode layer directly abuts the charge-transportable photo-conductor layer.

6. The detector of claim 1 wherein the reading charge-transportable photo-conductor layer acts substantially as an electrical insulator with respect to electric charges having a polarity identical with the polarity of the electric charges occurring in the first electrode layer, and acts substantially as an electrical conductor with respect to electric charges having a polarity opposite to the polarity of the electric charges occurring in the first electrode layer, when reading light is not irradiated to the single reading charge-transportable photo-conductor layer.

7. A radiation image detector, comprising:
   i) a first electrode layer, which has transmissivity with respect to radiation carrying radiation image information or with respect to recording light carrying the radiation image information,
   ii) a recording photo-conductor layer, which is capable of generating electric charges in accordance with a quantity of the radiation or the recording light irradiated to the recording photo-conductor layer when the radiation or the recording light having passed through the first electrode layer is irradiated to the recording photo-conductor layer,
   iii) a reading charge-transportable photo-conductor layer, which is capable of generating electric charges when reading light is irradiated to the reading charge-transportable photo-conductor layer, and which is capable of operating at a stage other than the stage of the irradiation of the reading light to the reading charge-transportable photo-conductor layer, such that the reading charge-transportable photo-conductor layer acts approximately as an electrical insulator with respect to electric charges having a polarity identical with the polarity of the electric charges occurring in the first electrode layer, and such that the reading charge-transportable photo-conductor layer acts approximately as an electrical conductor with respect to electric charges having a polarity opposite to the polarity of the electric charges occurring in the first electrode layer, and
   iv) a second electrode layer, which has transmissivity with respect to the reading light,
   the radiation image information being recorded as latent image charges at a charge accumulating section, which is formed at an interface between the recording photo-conductor layer and the reading charge-transportable photo-conductor layer, and
   wherein a first blocking photo-conductor layer, which has the transmissivity with respect to the radiation or the recording light, and which is capable of exhibiting electrical conductivity when the radiation or the recording light is irradiated to the first blocking photo-conductor layer, is located between the first electrode layer and the recording photo-conductor layer.

8. A radiation image detector as defined in claim 7 wherein a second blocking photo-conductor layer, which has the transmissivity with re spect to the reading light, and which is capable of exhibiting electrical conductivity when the reading light is irradiated to the second blocking photo-conductor layer, is located between the second electrode layer and the reading charge-transportable photo-conductor layer.

9. A radiation image detector as defined in claim 8 wherein the reading charge-transportable photo-conductor layer contains an alloy, which contains, as a principal constituent, at least one kind of substance selected from the group consisting of Se, Se—Te, Se—Te—As, Se—Te—P, Se—As, and Se—Sb and said alloy contains a small amount of Cl.

10. A radiation image detecting system, comprising:
   i) a radiation image detector, comprising:
   a) a first electrode layer, which has transmissivity with respect to radiation carrying radiation image information or with respect to recording light carrying the radiation image information,
   b) a recording photo-conductor layer, which is capable of generating electric charges in accordance with a quantity of the radiation or the recording light irradiated to the recording photo-conductor layer when the radiation or the recording light having passed through the first electrode layer is irradiated to the recording photo-conductor layer,
   c) a single reading charge-transportable photo-conductor layer, which is capable of generating electric charges when reading light is irradiated to the reading charge-transportable photo-conductor layer, and which is capable of operating at a stage other than the stage of the irradiation of the reading light to the reading charge-transportable photo-conductor layer, such that the reading charge-transportable photo-conductor layer acts substantially as an electrical insulator with respect to electric charges having a polarity identical with the polarity of the electric charges occurring in the first electrode layer, and such that the reading charge-transportable photo-conductor layer acts substantially as an electrical conductor with respect to electric charges having a polarity opposite to the polarity of the electric charges occurring in the first electrode layer, and
   d) a second electrode layer, which has transmissivity with respect to the reading light,
   the radiation image information being recorded as latent image charges at a charge accumulating section, which is formed at an interface between the recording photo-conductor layer and the reading charge-transportable photo-conductor layer, and
   ii) reading light irradiating means for irradiating the reading light to the side of the reading charge-transportable photo-conductor layer of the radiation image detector,
   the latent image charges, which have been accumulated at the charge accumulating section of the radiation image detector, being read out through the irradiation of the reading light to the side of the reading charge-transportable photo-conductor layer of the radiation image detector.

11. A radiation image detecting system as defined in claim 10 wherein the reading light irradiating means irradiates exciting light, which has a wavelength longer than the wavelength of the reading light, simultaneously with the irradiation of the reading light and to a position identical with the position, to which the reading light is irradiated, and
   the electric charges, which have been generated in the reading charge-transportable photo-conductor layer of the radiation image detector when the reading light has been irradiated to the reading charge-transportable photo-conductor layer, are excited by the irradiation of the exciting light.

12. A radiation image detector, comprising:
   i) a first electrode layer, which has transmissivity with respect to radiation carrying radiation image information or with respect to recording light carrying the radiation image information,
   ii) a recording photo-conductor layer, which is capable of generating electric charges in accordance with a quantity of the radiation or the recording light irradiated to the recording photo-conductor layer, iii) a reading charge-transportable photo-conductor layer, which is capable of generating electric charges when reading light is irradiated to the reading charge-transportable photo-conductor layer, such that the reading charge-transportable photo-conductor layer acts approximately as an electrical insulator with respect to electric charges having a polarity identical with the polarity of the electric charges occurring in the first electrode layer, and iv) a second electrode layer, abutting the reading charge-transportable photo-conductor layer, which has transmissivity with respect to the reading light, v) a charge accumulating section, wherein the radiation image information is recorded as latent image charges at the charge accumulating section, which is formed at an interface between the recording photo-conductor layer and the reading charge-transportable photo-conductor layer.

* * * * *